(12) United States Patent
Schmid et al.

(10) Patent No.: US 11,545,861 B2
(45) Date of Patent: *Jan. 3, 2023

(54) ROTOR UNIT AND ELECTRIC MOTOR

(71) Applicant: Nidec Corporation, Kyoto (JP)

(72) Inventors: Jürgen Schmid, Brackenheim (DE); Thomas Kübler, Untergruppenbach (DE); Kazunori Tategata, Stuttgart (DE)

(73) Assignee: Nidec Corporation, Kyoto (JP)

( * ) Notice: Subject to any disclaimer, the term of this patent is extended or adjusted under 35 U.S.C. 154(b) by 116 days.

This patent is subject to a terminal disclaimer.

(21) Appl. No.: 16/978,115

(22) PCT Filed: Feb. 28, 2019

(86) PCT No.: PCT/IB2019/051601
§ 371 (c)(1),
(2) Date: Sep. 3, 2020

(87) PCT Pub. No.: WO2019/171219
PCT Pub. Date: Sep. 12, 2019

(65) Prior Publication Data
US 2021/0013754 A1 Jan. 14, 2021

(30) Foreign Application Priority Data
Mar. 7, 2018 (DE) .......................... 102018105249.9

(51) Int. Cl.
H02K 1/27 (2022.01)
H02K 1/28 (2006.01)
H02K 1/278 (2022.01)

(52) U.S. Cl.
CPC ............... H02K 1/28 (2013.01); H02K 1/278 (2013.01)

(58) Field of Classification Search
CPC .......... H02K 1/28; H02K 1/278; H02K 29/00; H02K 15/03
See application file for complete search history.

(56) References Cited

U.S. PATENT DOCUMENTS 7,573,168 B2 * 8/2009 Carl, Jr. ................. H02K 1/276
310/156.19
7,687,957 B2 3/2010 Ochiai et al.
(Continued)

FOREIGN PATENT DOCUMENTS

CN 106130225 A 11/2016
DE 11 2012 001 551 T5 1/2014

OTHER PUBLICATIONS

Official Communication issued in International Patent Application No. PCT/IB2019/051601, dated May 27, 2019.
(Continued)

Primary Examiner — Thomas Truong
(74) Attorney, Agent, or Firm — Keating & Bennett

(57) ABSTRACT

The invention relates to a rotor unit for a brushless electric motor with
  an annular rotor core surrounding a central axis,
  a plurality of magnet arrangements that are arranged around the rotor core in a circumferential direction of the rotor and that each have a convex outer peripheral face, an inner contact face, two axial end faces and two side faces pointing in the circumferential direction,
  a magnet holder having a number of holding portions which are each arranged between two adjacent magnet arrangements and are moulded onto a ring portion of the magnet holder, wherein the holding portions are configured T-shaped in a cross section along a plane running transversely to the central axis and each have a shank portion and a head portion, wherein (Continued)

Figure 1:
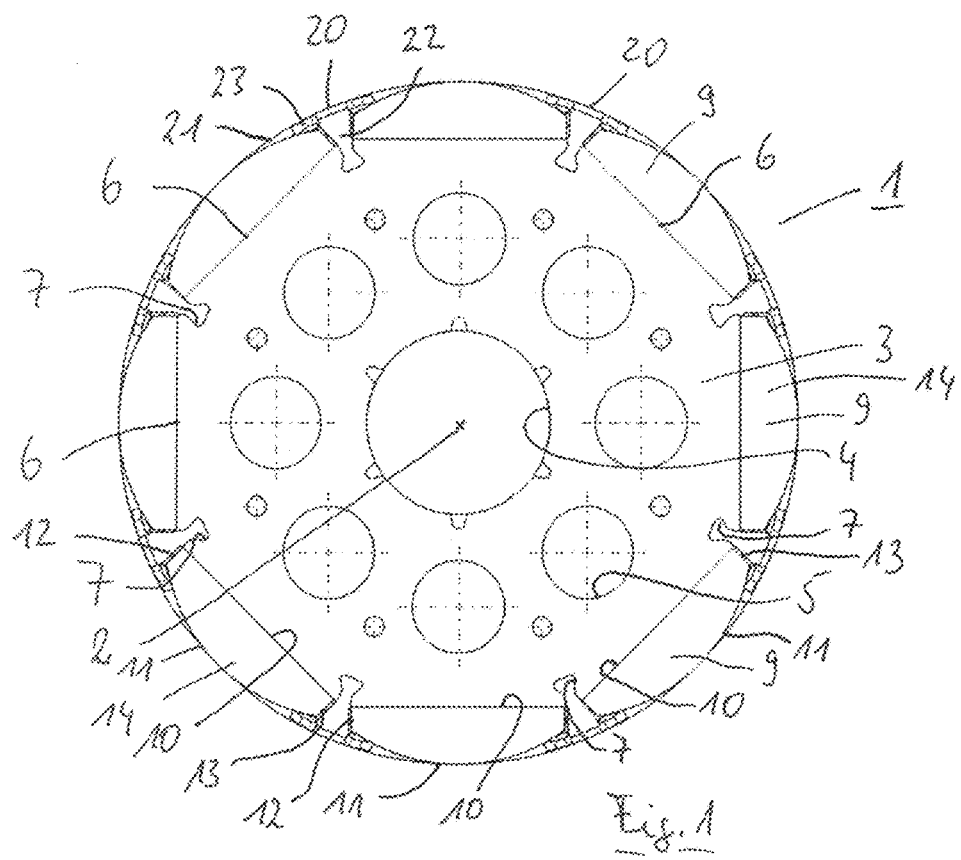

the shank portion lies on the side faces of the magnet arrangements in a contact region and the head portion lies on the peripheral faces of the magnet arrangements, wherein the head portion lies on the peripheral faces in a contact area, which contact area is separated by a distance from a transition between the shank portion and the head portion.

11 Claims, 2 Drawing Sheets

(56)  References Cited

U.S. PATENT DOCUMENTS

| | | | |
|---|---|---|---|
| 2008/0048517 A1* | 2/2008 | Ochiai | H02K 1/278 310/216.004 |
| 2009/0001839 A1 | 1/2009 | Masayuki et al. | |
| 2009/0261677 A1 | 10/2009 | Ishikawa et al. | |
| 2013/0257184 A1* | 10/2013 | Haga | H02K 1/278 310/43 |
| 2013/0257211 A1 | 10/2013 | Haga et al. | |
| 2015/0001978 A1 | 1/2015 | Haga et al. | |
| 2017/0117765 A1 | 4/2017 | Nishifukumoto et al. | |
| 2021/0021165 A1* | 1/2021 | Schmid | H02K 1/28 |

OTHER PUBLICATIONS

English translation of Official Communication issued in International Patent Application No. PCT/IB2019/051601, dated Sep. 8, 2020 and May 27, 2019.

\* cited by examiner

ROTOR UNIT AND ELECTRIC MOTOR

The present invention relates to a rotor unit for a brushless electric motor with the features of the preamble of claim 1 and to a brushless electric motor.

Electric motors in which the rotor has a permanent magnet are known from the prior art. The permanent magnets are arranged about a rotor core and lie on the outside thereof. The rotor defines the geometric axes and the directions that should be used in this description and the claims too. A central axis coincides with the symmetrical axis of the rotor and also represents the rotational axis of the rotor in the electric motor. The axial direction of the arrangement runs in the direction of the rotational axis. The radial direction is characterised by an increasing distance from the central axis. The permanent magnets on the rotor are therefore on the outside in a radial direction. The peripheral direction in which each direction vector is aligned vertically to a radius of the arrangement runs tangentially to the rotor.

According to the prior art, the electric motor also has a stator arranged in a radial direction outside of the rotor, which stator surrounds the rotor on the outside in a ring shape. The stator contains a number of electromagnets, which are generally formed from an iron core and a coil. A suitable current supply to the windings of the stator generates a rotational field which accordingly generates a torque in the rotor. The stator is arranged in a motor housing in which the rotor with its motor shaft is rotatably mounted.

The permanent magnets are usually made from a brittle material. The magnets are not screwed to the rotor core but rather sit on end faces of the rotor core which point in an outwards direction, where they are mechanically held by a magnet holder. The magnet holder absorbs the centrifugal force that acts on the magnets when the rotor rotates.

The magnet holders therefore have the object of holding the magnets in the intended position in a fixed and precise manner. They are also used as a guide. During manufacturing, the rotor core is initially equipped with the magnet holder and the magnets are then inserted into the intended positions, wherein they are inserted in an axial direction along the planar outer face of the rotor core between two respective holding portions of the magnet holder.

Various solutions for this are known from the prior art. Patent specification U.S. Pat. No. 7,687,957 B2 discloses a rotor unit having magnet holders with linear contact faces for the magnets in an axial direction. These linear contact faces have a low friction against the surface of the magnets when the magnets are mounted. Their function is also to keep the magnets in the intended position using spring force due to their elasticity.

Patent application US 2015/0001978 A1, on the other hand, discloses a rotor with magnet holders that are designed in a T-shaped manner in the cross-portion and sit with a shank portion between the magnets, while a head portion of the T-shaped cross-portion pushes on the magnets from the outside in a radial direction, thereby securing the magnets in their position. The full surface of the head portion lies on the magnets. In this way, the fixing of the magnets is particularly secure. However, the friction when the magnets are inserted between the magnet holders is undesirably high. This can cause wear or damage to the magnets.

The object of the present invention is therefore to create a rotor unit and an electric motor in which novel magnet holders on the one hand position the magnets sufficiently tightly and accurately on the rotor core and on the other enable decreased friction between the magnet holders and the outer face of the rotor core on insertion of the magnets.

This object is achieved by a rotor unit with the features of claim 1 and an electric motor with a rotor unit of this type.

Since in the case of a rotor unit according to the invention the intention is for the head portion to lie in a contact area on the circumferential face which is separated from a transition between the shank portion and the head portion by a distance, the magnet arrangements are reliably fixed to the rotor core. The mounting of the magnet arrangement is nevertheless simplified as the friction between the magnet holders and the magnet arrangements is reduced when the magnet arrangements are inserted in an axial direction.

The distance from the head portion in the circumferential direction is preferably 30% to 70%, particularly preferably 40% to 60% of the width of the head portion from its free end to the transition to the shank portion.

It is also advantageous if, alone or in combination with the feature mentioned above, the contact region of the shank portion in a radial direction of the side faces extends 30% to 70%, in particular 40% to 60% of the radial extension of the side faces.

The friction when mounting the magnet arrangements is further reduced if the axial extension of the contact region in which the shank portion lies on the magnet arrangement is less than the axial extension of the side faces of the magnet arrangement.

The magnet holder can preferably be made in an injection moulding process and inserted along with the shank portions in grooves of the rotor core running in an axial direction before the magnet arrangements are mounted on the rotor core.

A particularly advantageous embodiment provides for each magnet arrangement to have a permanent magnet and a magnetic field conductor, wherein the permanent magnet lies on an outer planar face of the rotor core and the magnetic field conductor lies on the radial outside of the permanent magnet. This increases the efficiency of the electric motor and decreases the weight and the rotational inertia moment. The magnet holder preferably only lies on the magnetic field conductor of the magnet arrangement. The magnetic field conductor can be made with a suitable surface which, together with the magnet holder, further facilitates mounting.

The object is also achieved by a brushless electric motor having a stator, a motor shaft rotatably mounted in a housing and a rotor unit with the features and advantages described above mounted on the motor shaft. An electric motor of this type is particularly robust, easier to manufacture and has a high degree of efficiency.

Figure 2:
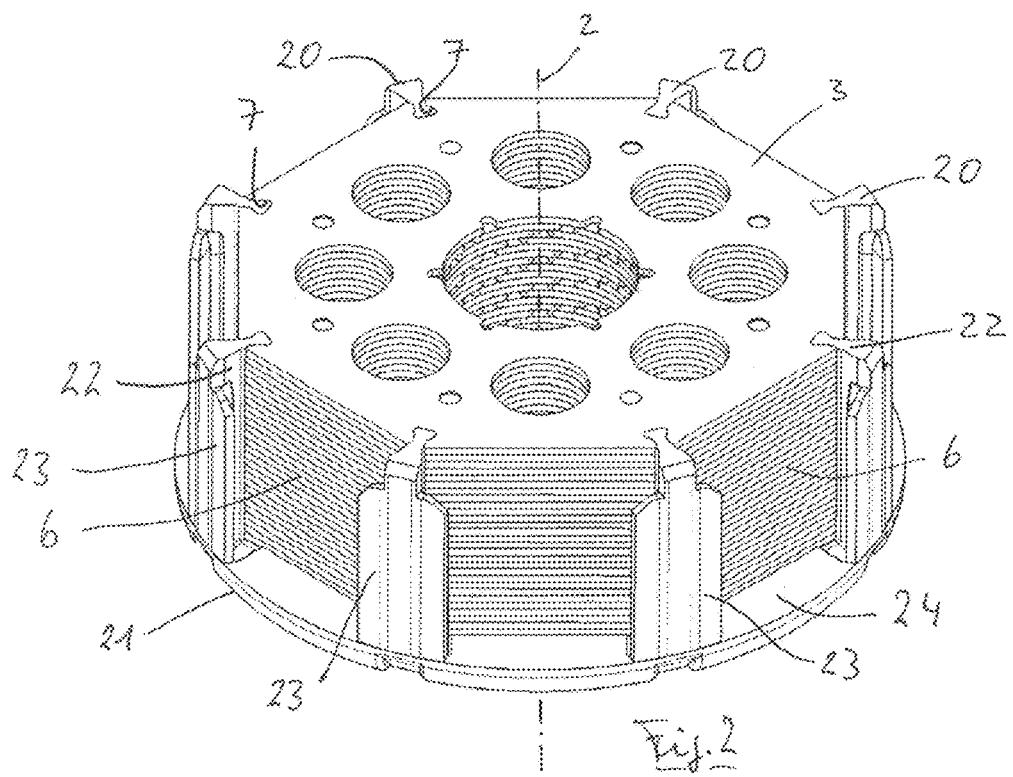
Figure 3:
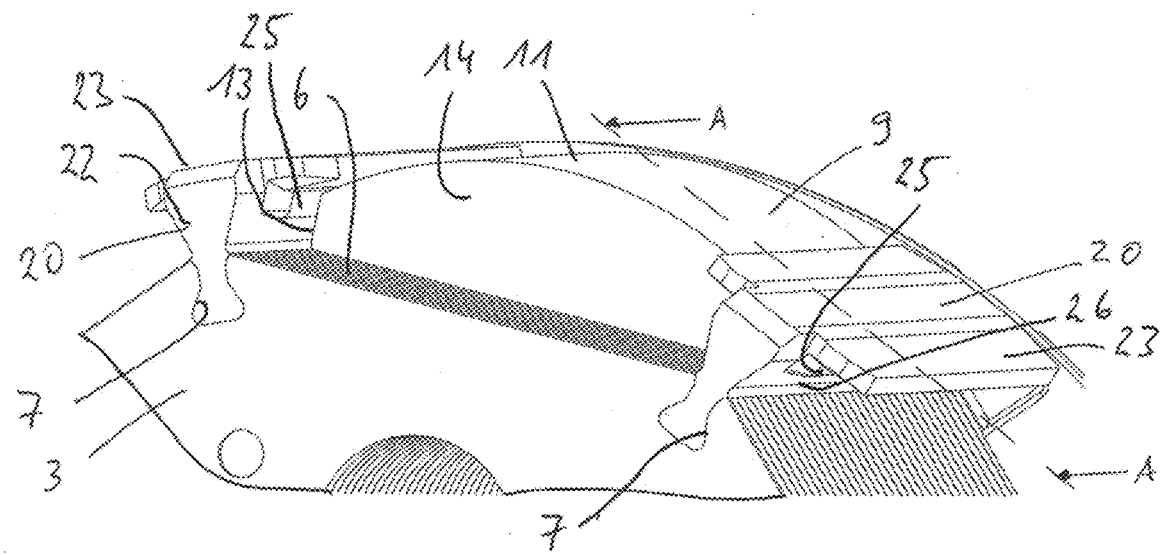
Figure 4:
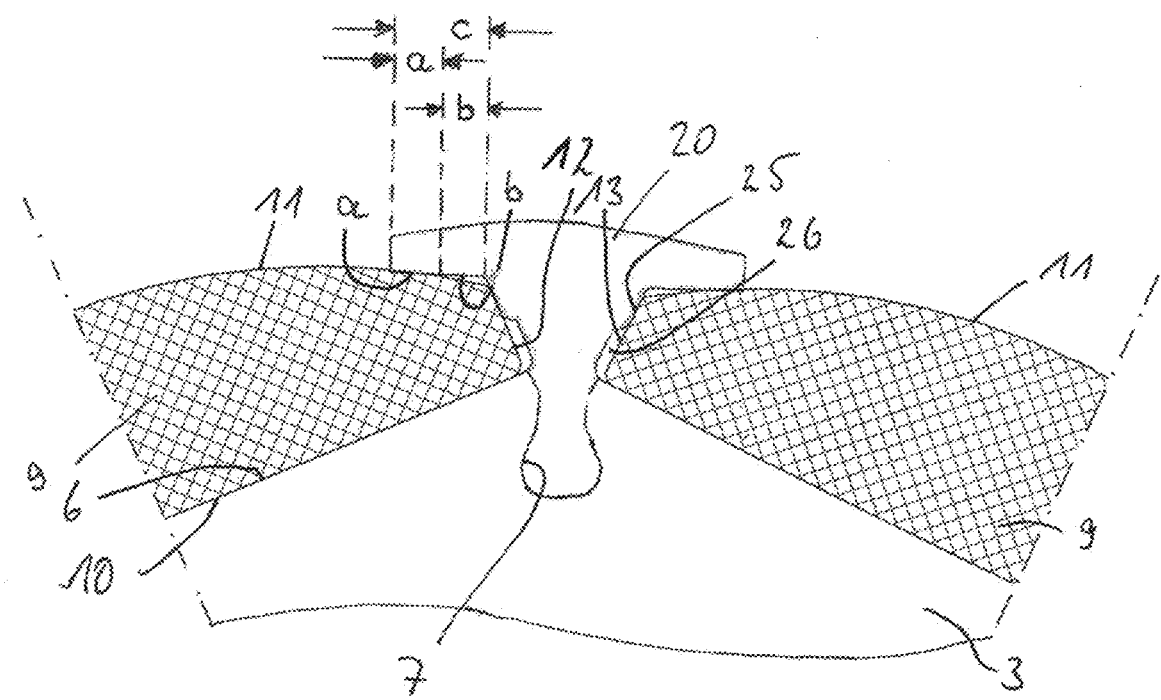

In the following, an embodiment of the invention is described in more detail on the basis of the drawing. In the drawing:

FIG. 1: shows a planar view of a rotor unit according to the invention in the direction of the central axis, FIG. 2: shows a perspective view of the rotor unit from FIG. 1 without magnets, FIG. 3: shows a perspective view of an enlarged section of a rotor unit according to FIG. 1, and FIG. 4: shows a cross section along the line A-A from FIG. 3.

FIG. 1 shows a planar view of a rotor unit 1 in the direction of a central axis 2 which coincides with an intended rotational axis of the rotor unit 1. The rotor unit 1 has an essentially rotationally symmetrical rotor core 3 with a central bore 4 to receive a motor shaft (not shown) and a number of axially parallel bores 5. On the outside, the rotor core 1 has flat outer faces 6 and in this embodiment has a total of eight outer faces 6, each of which is the same size and the same shape and which outer faces 6 are distributed at an equal angular distance along the outer peripheral face of the rotor core 3. A groove 7 is provided between each two outer faces 6, which is formed from the outside in the radial direction in the edge formed by the two adjacent outer faces 6 in this area. The groove is open in a radial direction outwards and runs parallel to the central axis 2. A total of eight permanent magnets 9 lie on the outer faces 6, which permanent magnets have a planar contact face 10 and an outer circumferential face 11 and side faces 12 and 13. The side faces 12 and 13 are each arranged pointing in the circumferential direction while the contact face 10 points inwards in a radial direction towards the rotor core 3 and the peripheral face 11 points outwards in a radial direction away from the rotor core 3. Finally, the permanent magnets 9 also have axial front faces 14, with only the front face turned towards the viewer visible in FIG. 1.

The permanent magnets 9 are held on the rotor core 3 by holding portions 20 of a magnet holder 21 which is not fully visible here.

The holding portions 20 each have a shank portion 22 and a head portion 23, wherein the shank portion 22 extends into the groove 7 and is held there in a positive-locking manner. The head portion 23 is moulded on the end of the shank portion 22 opposite to the groove 7 and extends in the circumferential direction of the arrangement. The permanent magnets 9 are fixed by the holding portions 20 in the circumferential direction of the rotor unit 1 by lying on the respective adjacent shank portion 22 with their side faces 12, 13. The permanent magnets are held by the head portions 23 in a radial direction.

FIG. 2 shows a perspective view of the rotor core from FIG. 1 but without the permanent magnets. The same components have the same reference numerals.

The outer faces 6 of the rotor core 3 can more easily be identified in FIG. 2. These are designed to be approximately square. The rotor core 3 itself is made from a plurality of sheets of essentially the same cross section. These are laminated to form a plate pack that forms the rotor core 3.

The magnet holder 21 can be seen better in this view. It has a ring portion 24, the diameter of which approximately corresponds to the diameter of the rotor unit 1, which ring portion lies on the axial end face of the rotor core 3. The ring portion further comprises the total of eight holding portions 20 which in FIG. 2 have been inserted into the grooves 7 from below when mounting the magnet holder 21. The shank portions 22 extend in a radial, outward direction from the groove 7 and each protrude outwards from the adjacent outer faces 6 of the rotor core 3 in the circumferential direction. The head portions 23 are moulded on the outer ends of the shank regions 22 and extend in an axial direction and in a circumferential direction.

FIG. 3 shows an enlarged, perspective view of a part of the rotor core 3 with two holding portions 20 and a permanent magnet 9 inserted therebetween. The holding portions 20 have a contact region 25 in their shank portion 22, in which the adjacent permanent magnet 9 lies with its side surface 12, 13 against the holding portion 20. The contact region 25 is arranged in a radial direction at a distance from the outer face 6 of the rotor core 3. A free space 26 is formed between the contact region 25 and the outer face 6 in which the side face 12, 13 of the permanent magnet 9 do not lie on the holding portion 20. The contact region 25 has a height in the radial direction that corresponds to around 50% of the height of the adjacent side face 12, 13. The radial outside of the contact region 25 transitions directly into the head portion 23.

Finally, FIG. 4 shows a cross section along the line A-A from FIG. 3, again in a demolished and enlarged view. In contrast to FIG. 3, FIG. 4 shows two permanent magnets 9 and a holding portion 20 lying therebetween.

The head portion 23 extends in a circumferential direction from the contact region 25 of the shank portion 22, thereby protruding over the peripheral face 11 of the permanent magnet 9. A width c of the overlap of the transition of the head portion 23 into the shank portion 22 as far as the free end of the head portion 23 is shown in FIG. 4 with the segment length c. The head portion 23 does not lie on the peripheral face 11 along the entire width c but rather only lies on a partial portion, a contact area a which directly lies on the free end of the head portion 23 and in the embodiment shown in FIG. 4 extends approximately 50% of the segment c. There is a distance b between the contact area a and the transition from the head portion 23 into the shank portion 22 in which the head portion 23 does not lie on the peripheral face 11. The lengths of the segments in the contact area a and the distance b in the circumferential direction add up to form the extension of the width c that is the above-mentioned overlap. The segment length a is therefore approximately 50% of the overlap.

Since, unlike in the prior art, the head portion does not lie on the peripheral face 11 along the full width, lower levels of friction occur in this region than in the prior art as described in the patent application US 2015/0001978 A1 when mounting the permanent magnets 9. Like the decreased friction in the contact region 25, this decreased friction results in the forces being decreased on mounting of the permanent magnets 9. This prevents both wear and damage to the permanent magnets 9 as described above.

Two different measures to decrease friction when mounting the magnets 9 have been described. On the one hand, the contact face on the shank portion 22 has been decreased, and on the other hand the contact face a in the overlap c of the head portion 23 and the peripheral face 11 is reduced. Each measure individually reduces the friction which occurs during mounting. Both measures are preferably used to achieve a particularly good result.

The embodiment described above relates to rotor units with permanent magnets 9. It can be generally used for rotor units which have magnet arrangements at the position of the permanent magnets 9 described which could, for example, be composed of permanent magnets and magnetic conductors to shape the magnetic field in a suitable manner.

The invention claimed is:
1. Rotor unit for a brushless electric motor comprising:
an annular rotor core surrounding a central axis,
a plurality of magnet arrangements which are arranged around the rotor core in a circumferential direction of the rotor unit, and which each have a convex outer peripheral face, an inner contact face, two axial end faces and two side faces pointing in the circumferential direction,
a magnet holder having a number of holding portions which are each arranged between two adjacent magnet arrangements and moulded onto a ring portion of the magnet holder, wherein the holding portions are configured T-shaped in a cross section along a plane running transversely to the central axis, and each have a shank portion and a head portion, wherein
the shank portion in a contact region lies on the side faces of the magnet arrangements and the head portion lies on the peripheral faces of the magnet arrangements, wherein the head portion lies on the peripheral faces in a contact area (a) which contact area (a) separated by a distance (b) from a transition between the shank portion and the head portion; and the distance (b) in the circumferential on has a width of 30% to 70% of a width (c) of the head portion from a free end of the head portion to the transition between the shank portion and the heed portion.

2. Rotor unit according to claim 1, wherein the distance (b) in the circumferential direction has a width of 40% to 60% of the width (c) of the head portion from its free end to its transition to the shank portion.

3. Rotor unit according to claim 2, wherein the axial extension of the contact region in which the shank portion lies on the magnet arrangement is smaller than the axial extension of the side faces of the magnet arrangement.

4. Rotor unit according to claim 1, wherein the magnet holder is made in an injection moulding process and inserted with the shank portions in axially running grooves of the rotor core before the magnet arrangements are mounted on the rotor core.

5. Rotor unit according to claim 1, wherein each magnet arrangement includes a permanent magnet.

6. Brushless electric motor with a stator, a motor shaft mounted rotatably in a housing, and a rotor unit according to claim 1 fixed to the motor shaft.

7. Rotor unit for a brushless electric motor comprising:
an annular rotor core surrounding a central axis,
a plurality of magnet arrangements which are arranged around the rotor core in a circumferential direction of the rotor unit and which each have a convex outer peripheral face an inner contact face, two axial end faces and two side faces pointing in the circumferential direction, a magnet holder having a number of holding portions which are each arranged between two adjacent magnet arrangements and moulded onto a in or ion of the magnet holder, wherein the holding portions are configured T-shaped in a cross section along wane running transversely to the central axis, and each have a shank portion and a head portion wherein the shank portion in a contact region lies on the side faces of the magnet arrangements and head portion lies on the peripheral of the magnet arrangements, wherein the head portion lies on the peripheral faces in a contact area (a) which contact area (a) separated by a distance (b) from a transition between the shank portion and the head portion, and a contact region of the shank portion in the radial direction of the side faces has an extension of 30% to 70% of the radial extension of the side faces.

8. Rotor unit according to claim 7, wherein the contact region of the shank portion in the radial direction of the side faces has an extension of 40% to 60% of the radial extension of the side faces.

9. Rotor unit according to claim 7, wherein the magnet holder is made in an injection moulding process and inserted with the shank portions in axially running grooves of the rotor core before the magnet arrangements are mounted on the rotor core.

10. Rotor unit according to claim 7, wherein each magnet arrangement includes a permanent magnet.

11. Brushless electric motor comprising a stator, a motor shaft mounted rotatably in a housing, and a rotor unit according to claim 7 fixed to the motor shaft.

* * * * *